(12) United States Patent
Sumi (10) Patent No.: US 12,250,450 B2
(45) Date of Patent: *Mar. 11, 2025

(54) METHOD FOR EDITING AN IMAGE

(71) Applicant: InnoLux Corporation, Miao-Li County (TW)

(72) Inventor: Naoki Sumi, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,937

(22) Filed: Aug. 22, 2023

(65) Prior Publication Data

US 2023/0396872 A1   Dec. 7, 2023

Related U.S. Application Data

(63) Continuation of application No. 17/029,009, filed on Sep. 22, 2020, now Pat. No. 11,778,306.

(60) Provisional application No. 62/958,319, filed on Jan. 8, 2020.

(51) Int. Cl.
| | |
|---|---|
| *H04N 23/00* | (2023.01) |
| *G06F 3/04845* | (2022.01) |
| *G06T 11/00* | (2006.01) |
| *G06T 11/60* | (2006.01) |
| *H04N 9/64* | (2023.01) |
| *H04N 23/63* | (2023.01) |

(52) U.S. Cl.
CPC ....... *H04N 23/632* (2023.01); *G06F 3/04845* (2013.01); *G06T 11/001* (2013.01); *G06T 11/60* (2013.01); *H04N 9/64* (2013.01)

(58) Field of Classification Search
CPC ........ H04N 23/632; H04N 9/64; H04N 23/84; G06F 3/04845; G06T 11/001; G06T 11/60; G06T 5/90
See application file for complete search history.

(56) References Cited

U.S. PATENT DOCUMENTS

2006/0245428 A1* 11/2006 Yanamoto ................ H04L 9/40
                                                          370/394
2018/0262758 A1*  9/2018 El-Ghoroury ........ G02B 27/017

* cited by examiner

*Primary Examiner* — Sarah Lhymn
(74) *Attorney, Agent, or Firm* — Winston Hsu (57) ABSTRACT

A method for editing an image includes an image capturing device capturing the image and generating displaying data according to the image and an image input unit reading the displaying data of the image. The displaying data includes a plurality of angular profiles of an object in the image, a plurality of color maps, and a plurality of discrete cosine transform coefficient maps corresponding to the plurality of angular profiles. The angular profiles include color information of the object corresponding to a plurality of viewing angles, and each of the plurality of color maps is corresponding to a specific angle and a specific color. The method further includes a processor altering the plurality of angular profiles of the object to generate edited displaying data according to at least one editing instruction, and an image output unit outputting the edited displaying data.

20 Claims, 7 Drawing Sheets

METHOD FOR EDITING AN IMAGE

CROSS REFERENCE TO RELATED APPLICATIONS

This application is a continuation application of U.S. application Ser. No. 17/029,009, filed on Sep. 22, 2020, which claims the benefit of U.S. Provisional Application No. 62/958,319, filed on Jan. 8, 2020. The contents of these applications are incorporated herein by reference.

BACKGROUND OF THE DISCLOSURE

1. Field of the Disclosure

The present disclosure is related to a method for editing an image, and more particularly, to a method for editing angular profiles of an image.

2. Description of the Prior Art

Since the display devices have been adopted in more and more fields, the requirement for better visual effects is raised. For example, high dynamic range (HDR) displays have been developed to show high contrast images so the details in both the bright portion and the dark portion of an image can be seen. Although the HDR display is able to show images with greater brightness contrast and delivers better visual effects than the traditional display apparatus, the HDR display still has difficulty in showing the real light shining effects or the kirameki effect.

For example, some objects, such as butterfly wings and bubbles, can scatter the light and produce structural colors. In this case, to present such an effect, the display device may have to display different lighting profiles to different directions, so the people may see different colors and/or light intensities when looking at the object from different positions. However, the conventional display can only show the fixed reflection profile of a static scene. Furthermore, even with the display device capable of showing the kirameki effects, the lighting profiles of the images may still need to be enhanced or edited for providing satisfying visual quality.

SUMMARY OF THE DISCLOSURE

An embodiment provides a method for editing an image including an image capturing device capturing the image and generating displaying data according to the image and an image input unit reading the displaying data of the image. The displaying data includes a plurality of angular profiles of an object in the image, a plurality of color maps, and a plurality of discrete cosine transform coefficient maps corresponding to the plurality of angular profiles. The angular profiles comprise color information of the object corresponding to a plurality of viewing angles, and each of the plurality of color maps is corresponding to a specific angle and a specific color. The method further includes a processor altering the plurality of angular profiles of the object to generate edited displaying data according to at least one editing instruction, and an image output unit outputting the edited displaying data.

Another embodiment provides a method for editing an image including an image input unit reading displaying data of the image. The displaying data includes a plurality of angular profiles of an object in the image, a plurality of color maps, and a plurality of discrete cosine transform coefficient maps corresponding to the plurality of angular profiles. The angular profiles comprise color information of the object corresponding to a plurality of viewing angles, and each of the plurality of color maps is corresponding to a specific angle and a specific color. The method further includes a processor altering the plurality of angular profiles of the object to generate edited displaying data according to at least one editing instruction, an image output unit outputting the edited displaying data, a display panel presenting the edited displaying data by simultaneously displaying a plurality of images corresponding to the plurality of viewing angles, and an optical modulator directing the plurality of images displayed by the display panel to different directions.

An embodiment provides an image editing system include an image input unit, a processor, an image output unit, and a display device. The image input unit is used to read displaying data of an image. The displaying data includes a plurality of angular profiles of an object in the image, a plurality of color maps, and a plurality of discrete cosine transform coefficient maps corresponding to the plurality of angular profiles. The angular profiles comprise color information of the object corresponding to a plurality of viewing angles, and each of the plurality of color maps is corresponding to a specific angle and a specific color. The processor is used to receive the displaying data from the image input unit, and alter the plurality of angular profiles of the object to generate edited displaying data according to at least one editing instruction. The image output unit is used to output the edited displaying data. The display device includes a display panel and an optical modulator. The display panel is used to present the edited displaying data by simultaneously displaying a plurality of images corresponding to the plurality of viewing angles. The optical modulator is used to direct the plurality of images displayed by the display panel to different directions.

These and other objectives of the present disclosure will no doubt become obvious to those of ordinary skill in the art after reading the following detailed description of the embodiment that is illustrated in the various figures and drawings.

DETAILED DESCRIPTION

Figure 1:
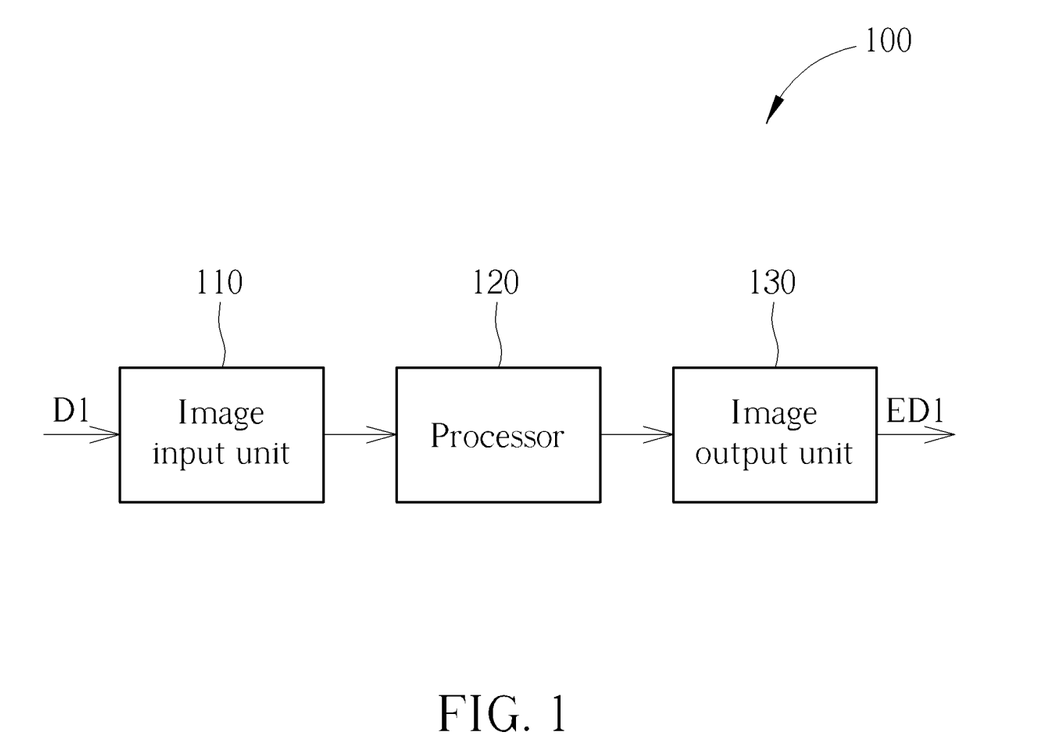
FIG. 1 shows an image editing system according to one embodiment.

FIG. 1 shows an image editing system 100 according to one embodiment. The image editing system 100 includes an image input unit 110, a processor 120, and an image output unit 130.

The image input unit 110 may read the displaying data D1 of an image for editing. In some embodiments, the displaying data D1 may include angular profiles of objects in the image, and the angular profiles may include the color information of the objects corresponding to a plurality of viewing angles. The processor 120 may receive the displaying data D1 from the image input unit 110, and alter the angular profiles of the objects in the displaying data D1 to generate edited displaying data ED1 according to editing instruction(s). The image output unit 130 may output the edited displaying data ED1.

Figure 2:
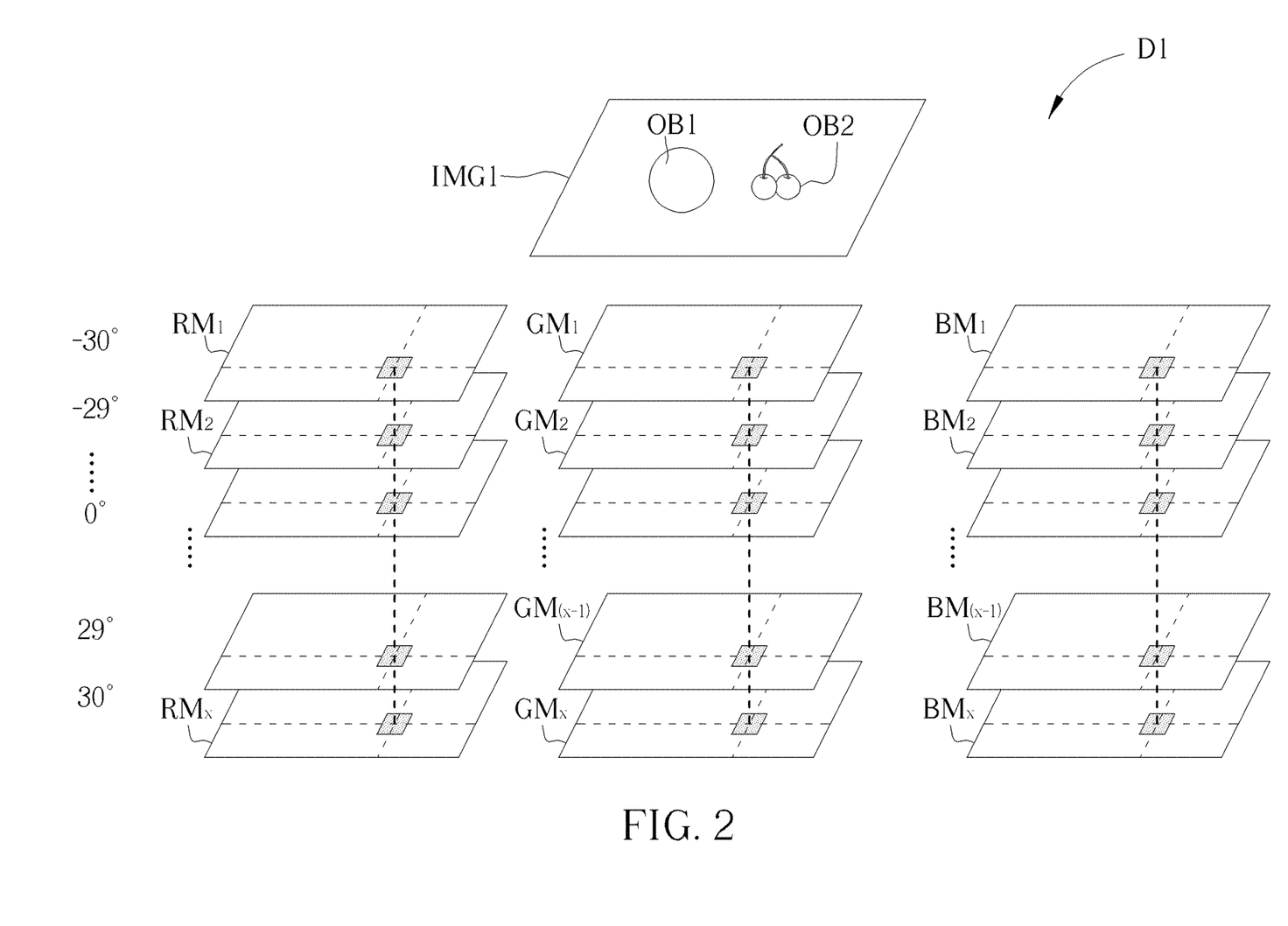
FIG. 2 shows the displaying data of the image according to one embodiment.
Figure 3:
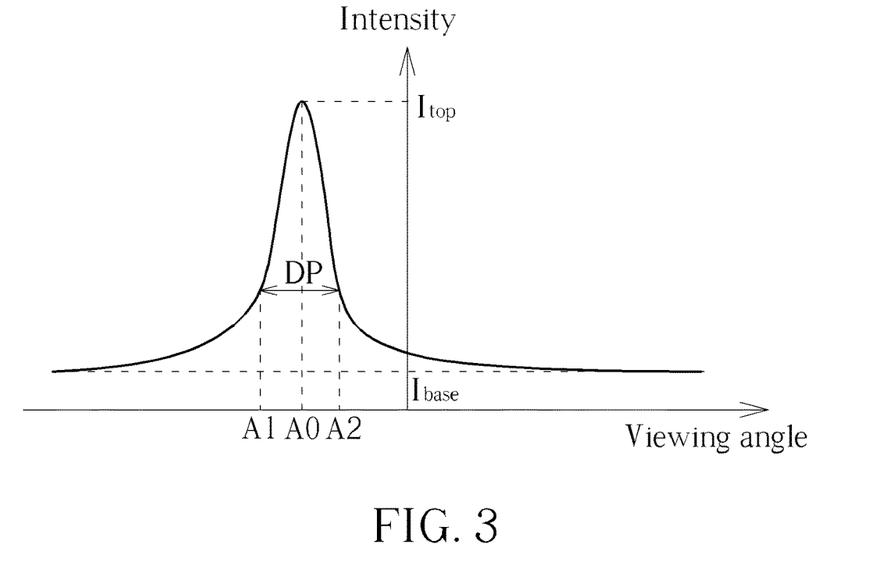
FIG. 3 shows the angular profile of a point on the object in the image.

FIG. 2 shows displaying data D1 of the image IMG1 according to one embodiment. In FIG. 2, the image IMG1 includes objects OB1 and OB2. Since the objects OB1 and OB2 may comprise different materials, they may have different angular profiles. In some other embodiments, the angular profiles may be referred as lighting profiles. FIG. 3 shows the angular profile of a point on the object OB1. In FIG. 3, the object OB1 may be a metal ball. Therefore, the angular profile of the point may have an intensity peak when the viewing angles are within a small region between A1 and A2. That is, when the viewer views the object OB1 within viewing angles A1 to A2, the viewer may see bright reflection light. However, if the viewer views the object OB1 outside the viewing angles A1 to A2, the viewer may not see the reflection light.

However, although the different parts of the object OB1 may comprise the same material, the different parts of the object OB1 may still have different angular profiles due to their relative positions with the light source being different. In addition, some materials may have different angular profiles for different colors. For example, when the viewer watches the bubbles or the wings of butterflies, the viewer may see different colors when the viewer changes the viewing angle.

Therefore, in some embodiment, the displaying data D1 in FIG. 2 may include a plurality of color maps. Each color map may be corresponding to a specific angle and a specific color. For example, in FIG. 2, the color maps $RM_1$ to $RM_x$ may record the intensities of the red color to be presented by the pixels of the image IMG1 for X different viewing angles, where X is an integer greater than 1.

In some embodiments, X may be, for example, but not limited to, 61. In this case, each of the color maps $RM_1$ to $RM_x$ may be corresponding to one viewing angles of −30°, −29°, . . . −1°, 0°, 1°, . . . 29°, and 30°.

Similarly, the displaying data D1 may further include color maps $GM_1$ to $GM_x$ for recording the intensities of the green color for X different viewing angles, and color maps $BM_1$ to $BM_x$ for recording the intensities of the blue color for X different viewing angles.

In this case, the displaying data D1 may use the red color maps $RM_1$ to $RM_x$, the green color maps $GM_1$ to $GM_x$ and the blue color maps $BM_1$ to $BM_x$ to record the angular profiles of the objects in the image IMG1. However, in some other embodiments, color maps based on different types of color spaces may be used. For example, the displaying data D1 may include color maps for recording the luminance and chrominance based on the YUV color space.

Furthermore, in some embodiments, to reduce the size of the displaying data, the displaying data may record the angular profiles by fitting parameters that may describe the angular profiles. For example, the angular profile in FIG. 2 may be described by the fitting parameters such as the top intensity $I_{top}$ of the angular profile, the peak angle A0 at which the angular profile has the top intensity $I_{top}$, the base intensity $I_{base}$, and the dispersion factor DP as shown in FIG. 3.

Figure 4:
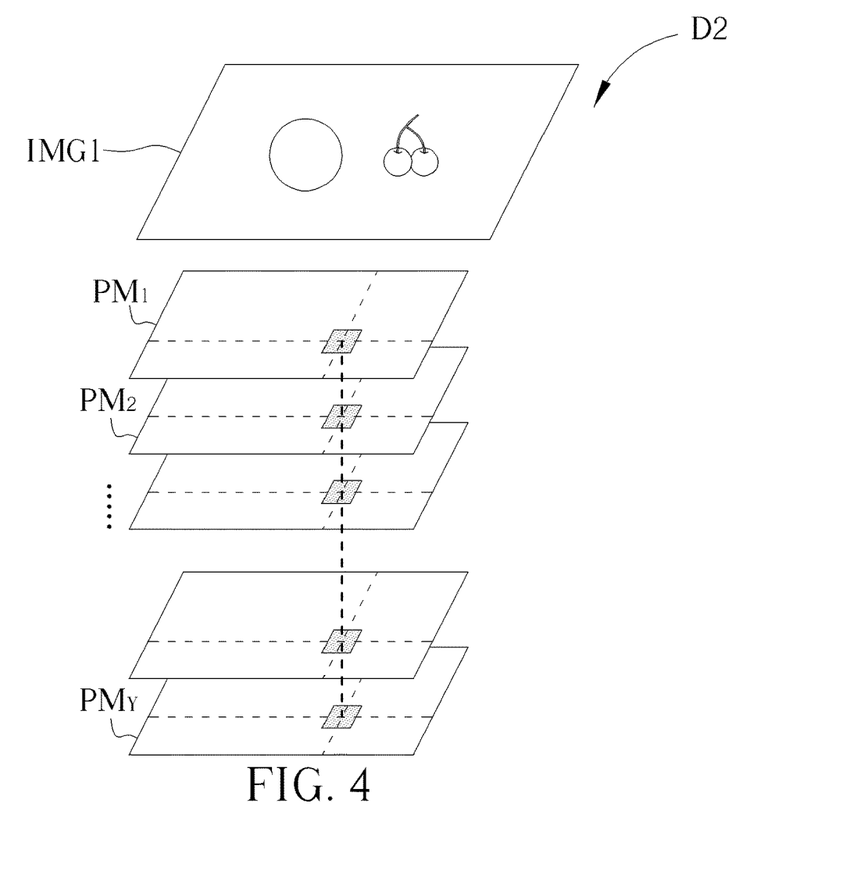
FIG. 4 shows the displaying data according to one embodiment.

FIG. 4 shows displaying data D2 according to one embodiment. In some embodiments, the displaying data D2 may be used to store the angular profiles of the objects in the image IMG1. In FIG. 4, the displaying data D2 may include a plurality of parameter maps $PM_1$ to $PM_y$, where Y is an integer greater than 1. Each of the parameter maps $PM_1$ to $PM_y$ may be corresponding to a specific fitting parameter of the angular profiles. For example, the parameter map $PM_1$ may record the peak angles, the parameter map $PM_2$ may record the top intensity, and the parameter map $PM_3$ may record the base intensity. However, since different types of materials may have different angular profiles, the fitting parameters used for describing different angular profiles may be different. Therefore, in some embodiments, the image input unit 110 may receive a header file listing the fitting parameters used for describing the angular profiles, so the processor 120 may analyze and edit the displaying data D2 later.

Figure 5:
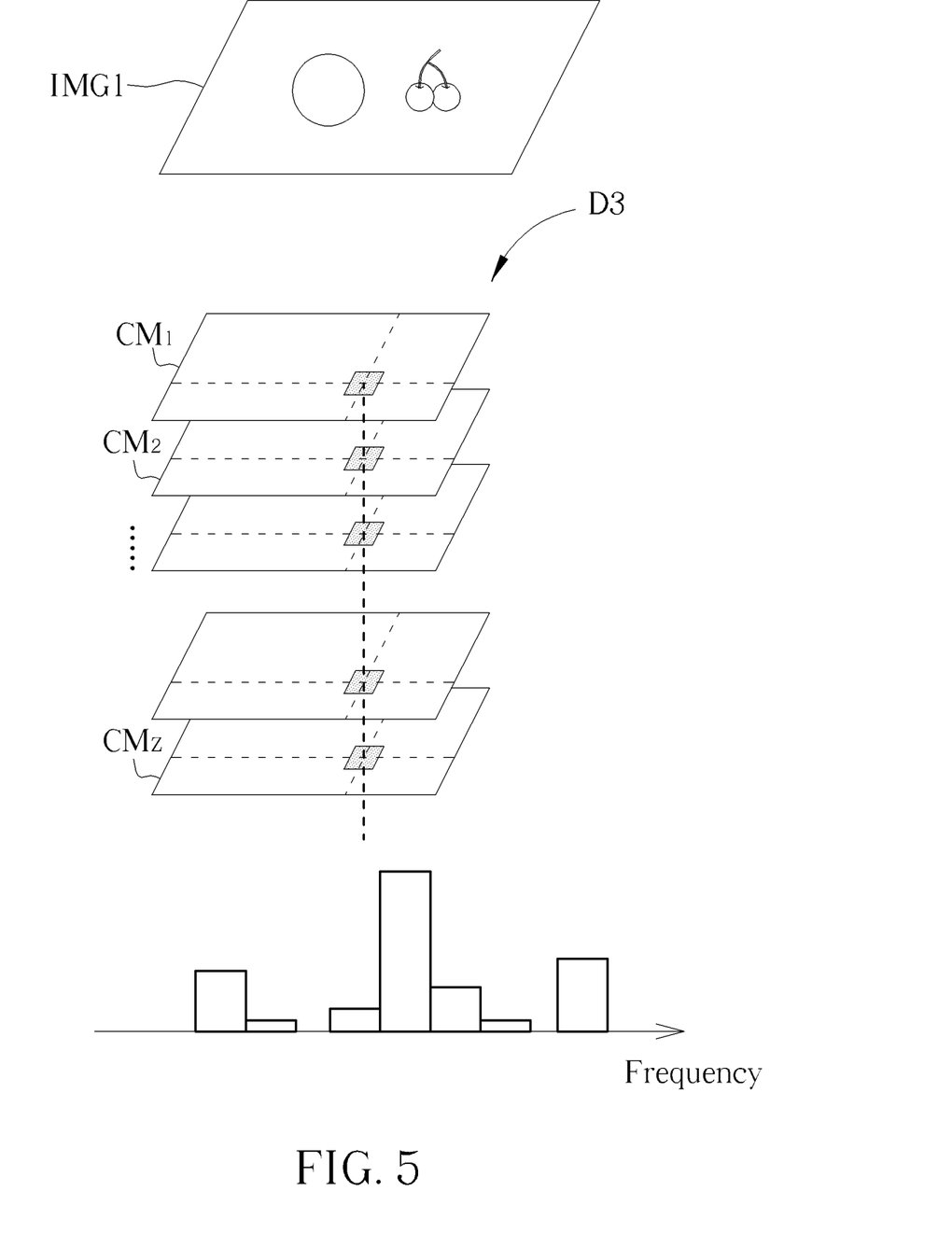
FIG. 5 shows a discrete cosine transform of the angular profile in FIG. 3 and the displaying data.

In some embodiments, the discrete cosine transform (DCT) may be used to generate a series of coefficients for describing the angular profile in a universal manner. FIG. 5 shows a discrete cosine transform of the angular profile in FIG. 3 and the displaying data D3. In FIG. 5, the angular profile may be transformed to the frequency domain by using the discrete cosine transform. Since the angular profiles are usually rather simple without too many turning points, the number of non-zero DCT coefficients or the number of significant DCT coefficients is usually rather small. Therefore, in some embodiments, the displaying data D3 may include a plurality DCT coefficient maps $CM_1$ to $CM_z$ corresponding to the angular profiles, where Z is an integer greater than 1. For example, each of the DCT coefficient maps $CM_1$ to $CM_z$ may be corresponding to the coefficients of a specific frequency of the angular profiles. Consequently, the angular profiles may be recorded in a form of frequency, and the required data size for recording the angular profiles may be reduced significantly.

After the processor 120 receives the displaying data D1 (or D2 or D3) from the image input unit 110, the processor 120 may alter the angular profiles of the objects to generate edited displaying data ED1 according to editing instruction(s). In some embodiments, the image input unit 110 may provide a user interface for the user to command the processor 120 to perform the desired editing instructions. For example, the image editing system 100 may present a user interface to show the image to be edited and the tools or instruction bars for editing the image. However, unlike any other software, the image editing system 100 allows editing instructions for editing the angular profiles of the objects in the images. The editing instructions may include a generation instruction, a transform instruction, a select instruction, a copy and paste instruction, and/or a synthesize instruction, but not limited thereto.

For example, when the processor 120 is requested to perform the generation instruction, the processor 120 may generate a new angular profile for the object accordingly. For example, the image IMG1 may include objects having constant angular profiles. That is, when the viewer changes his/her viewing angle, these objects will present the same lighting profile, and the viewer will see the same visual effects from all different viewing angles. Or the user of the image editing system 100 may like to change the material of the object to enhance the visual effects of the image IMG1. In these cases, the generation instruction may be adopted, and the processor 120 may include a database for storing angular profiles of different materials, such as metal, woods, and glass, so the user may select the angular profile of the desired material and apply the angular profile to the selected object. In some embodiments, the processor 120 may need to analyze the depth information of the surface of the selected object, and the position of the light source(s), so the selected angular profile may be applied to the object in compliance with the environment and other objects in the image IMG1. Furthermore, in some other embodiments, the processor 120 may allow the user to create anew angular profile instead of applying the angular profiles stored in the database directly.

In addition, when the processor 120 is requested to perform the transform instruction, the processor 120 may sharpen the angular profiles, broaden the angular profiles, shift the angular profiles in angles or in intensities, reverse the angular profiles in angles or in intensities, scale the angular profiles, duplicate the angular profiles, remove noises from the angular profiles, and/or add noises to the angular profiles accordingly, but not limited thereto.

For example, the processor 120 may sharpen the angular profiles by increasing the top intensity of the angular profile and narrowing the regions of viewing angles that may see the reflection light. In this case, the edited displaying data ED1 will present a sharper specular reflection on the selected object. In contrary, the processor 120 may broaden the angular profiles by decreasing the top intensity of the angular profile and widening the region of the viewing angles that may see the reflection light. In this case, the edited displaying data ED1 will present a broader specular reflection on the selected object.

Figure 6:
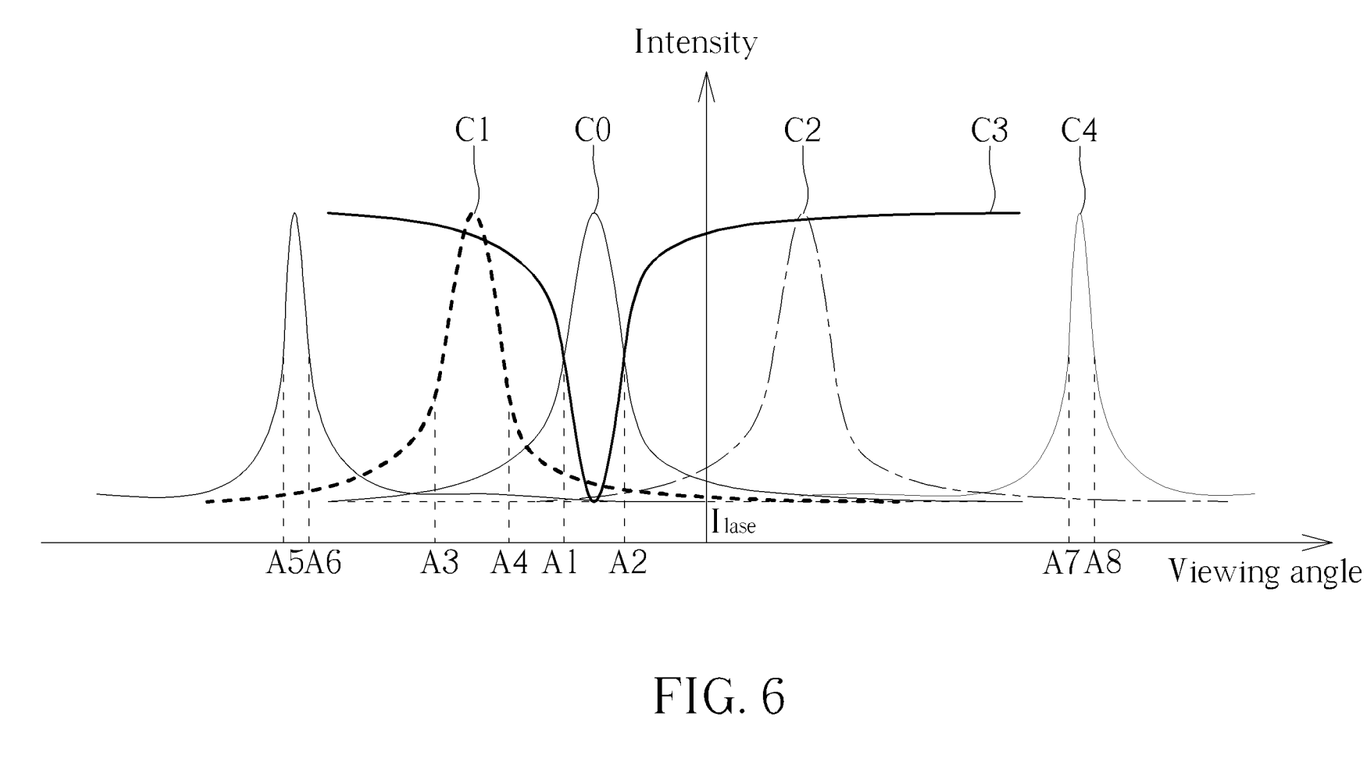
FIG. 6 shows an original angular profile and the transformed angular profiles.

In another example, the processor 120 may shift the angular profiles by shifting the angles corresponding to the peak intensities. FIG. 6 shows an original angular profile and the transformed angular profiles. In FIG. 6, the curve C0 may represent the original angular profile, and the curve C1 may represent the angular profile being transformed by shifting in angles. According to curve C0, the peak intensities should be seen within the angles A1 to A2 in the original angular profile; however, after being shifted, the peak intensities will be seen within the angles A3 to A4 according to the curve C1. In some embodiments, shifting the angular profiles of an object in angles may create the visual effect of rotating the object. However, in some embodiments, the processor 120 may shift the angular profiles by shifting the top intensities and/or the base intensities to enhance or weaken the specular reflection effect.

In addition, the processor 120 may reverse the angular profiles in angles and/or in intensities according to the transform instructions. In FIG. 6, curve C2 may represent the angular profile after being reversed in angles, and curve C3 may represent the angular profile after being reversed in intensities.

Furthermore, the processor 120 may duplicate and scaling the angular profile in angles. In FIG. 6, curve C4 may represent the angular profile after being duplicated and scaled in angles. In this case, the viewer may see the specular reflection on the object from the viewing angles A5 to A6 and from the viewing angles A7 to A8.

Nevertheless, the processor 120 may add noises to the angular profiles, which may make the surface of the object look bumpy. In contrary, the processor 120 may remove noises from the angular profiles so the surface of the object may look smoother.

In some embodiments, the processor 120 may alter the angular profiles of different colors according to the transformation instruction. For example, the processor 120 may shift the color in hue or color purity, so that the viewer may see different colors as the viewer changes the viewing angles, creating unique kirameki effects.

By providing different types of transform instructions, the image editing system 100 would be able to create different types of effects, enriching the visual experience and enhancing the image quality.

In some embodiments, to perform the transform instruction accurately on the selected objects, the processor 120 may need to be able to define the boundary of the selected objects. For example, to select the object, the user may click on a spot of the object through the user interface of the image editing system 100. In this case, the processor 120 would analyze the angular profile of the selected position of the object, that is, the angular profile of the clicked spot, to determine the material type of the object. After the processor 120 has determined the material type of the object, the processor 120 may combine the positions adjacent to the selected position having angular profiles that are determined to be the same material type of the object to define the boundary of the object. For example, if the clicked position is determined to have angular profiles similar to metal, the processor 120 may combine all the adjacent parts having the angular profiles of metal as a complete region of the selected object. That is, the boundary of the object may be defined by analyzing the angular profiles of the adjacent positions.

After the object is selected, the processor 120 may perform the transformation instruction accordingly. Furthermore, in some embodiments, after the object is selected, the processor 120 may perform a copy and paste instruction to copy the angular profiles of the selected object, and paste the angular profiles of the selected object to another selected object. For example, the user may select the object OB1 in FIG. 2, copy the angular profiles of the object OB1, select the object OB2 in FIG. 2, and paste the angular profiles of the object OB1 to the object OB2. In this case, the object OB2 will have the same metallic angular profiles as the object OB1.

Figure 7:
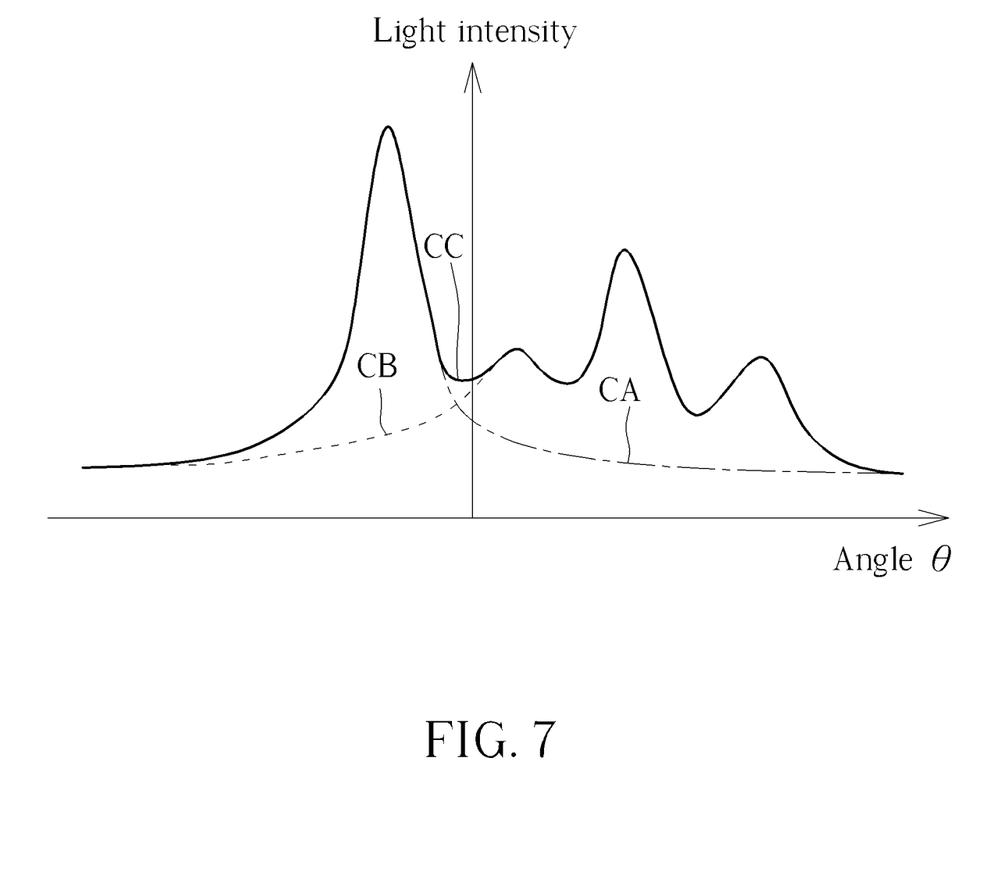
FIG. 7 shows the angular profiles of the objects in the image and the synthesized angular profiles.

In addition, the processor 120 may synthesize at least one angular profile to a selected object in the image according to a synthesize instruction. FIG. 7 shows the angular profiles of the objects OB1 and OB2 and the synthesized angular profile. In FIG. 7, the curve CA shows the angular profile of the object OB1, the curve CB shows the angular profile of the object OB2, and the curve CC shows the synthesized angular profile of the object OB1 and OB2. By synthesizing the two angular profiles, the selected area may show the shining effects of two different materials at the same time, simulating the translucent visual effects.

By using the editing instructions, such as the generation instruction, the transform instruction, the select instruction, the copy and paste instruction, and the synthesize instruction, the user may use image editing system 100 to edit the displaying data D1 of the image IMG1 to generate the edited displaying data ED1 showing the desired visual effects.

Figure 8:
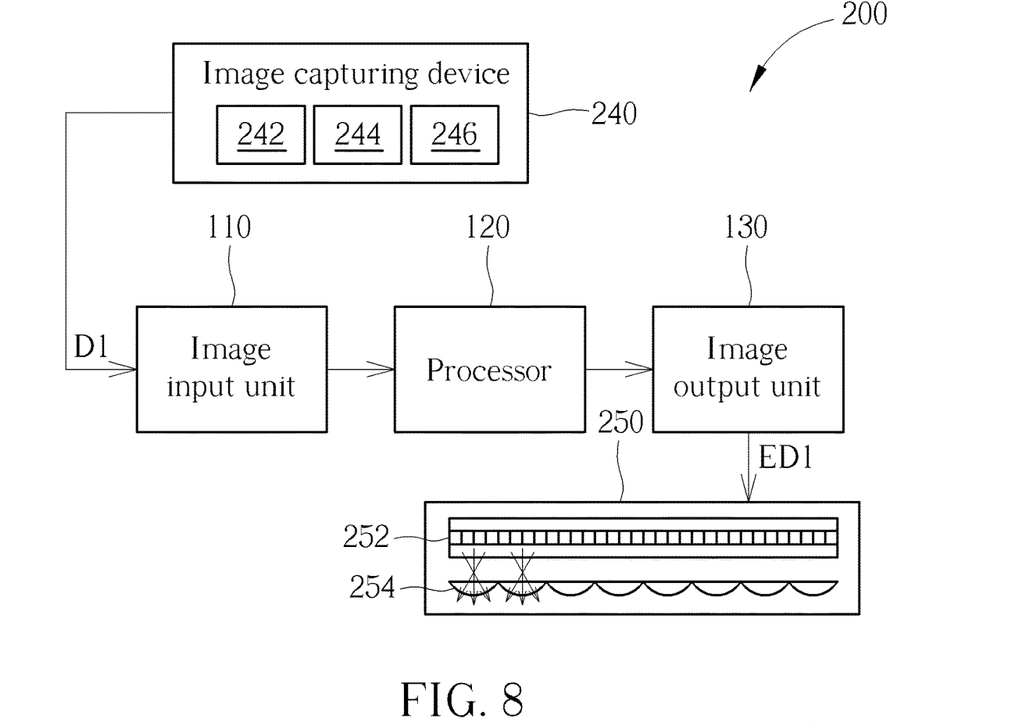
FIG. 8 shows an image editing system according to another embodiment.

FIG. 8 shows an image editing system 200 according to another embodiment. The image editing system 200 may be operated by the similar principles as the image editing system 100. However, the image editing system 200 may further include an image capturing device 240 and a display device 250.

The image capturing device 240 may capture images to generate the displaying data D1. In some embodiments, the image capturing device 240 may include a multi-lens camera 242 for capturing the angular profiles of the objects. However, in some other embodiments, the image capturing device 240 may include a single-lens camera without using the multiple lenses if the software for constructing the angular profiles is available.

In addition, the image capturing device 240 may further include a depth sensor 244 and a fish eye sensor 246. The depth sensor 244 may be adopted to obtain the depth information of the objects so the angular profiles derived by the image capturing device 240 may be even more accurately. The fish eye sensor 246 may be adopted to obtain the lighting map of the scene. For example, the fish eye sensor 246 may record the positions of the lighting sources of the scene, making the angular profiles more realistic. However, the depth sensor 244 and the fish eye sensor 246 may be omitted according to the system requirement, that is, the depth sensor 244 and the fish eye sensor 246 may be optional. In other embodiments, other suitable sensors may be included in the image capturing device 240, but it is not limited thereto.

Furthermore, the display device 250 may include a display panel 252 and an optical modulator 254. The display panel 252 may be, for example but not limited to, a liquid crystal display panel, and may present the edited displaying data ED1 by displaying a plurality of images corresponding to a plurality of viewing angles at the same time, and the optical modulator 254 may direct the plurality of images displayed by the display panel 252 to different directions. The optical modulator 254 may be a lenticular lens, a liquid crystal gradient-index (GRIN) lens, a parallax barrier, a liquid crystal barrier or alight emitting diode (LED) display panel. Consequently, when the viewer watches the display device 250 from different viewing angles, the viewer may see different lighting profiles of the objects. Consequently, the result of the angular profiles edited by the image editing system 200 may be shown to the user, allowing the user to make further adjustments to the image IMG1 according to the displaying result.

Figure 9:
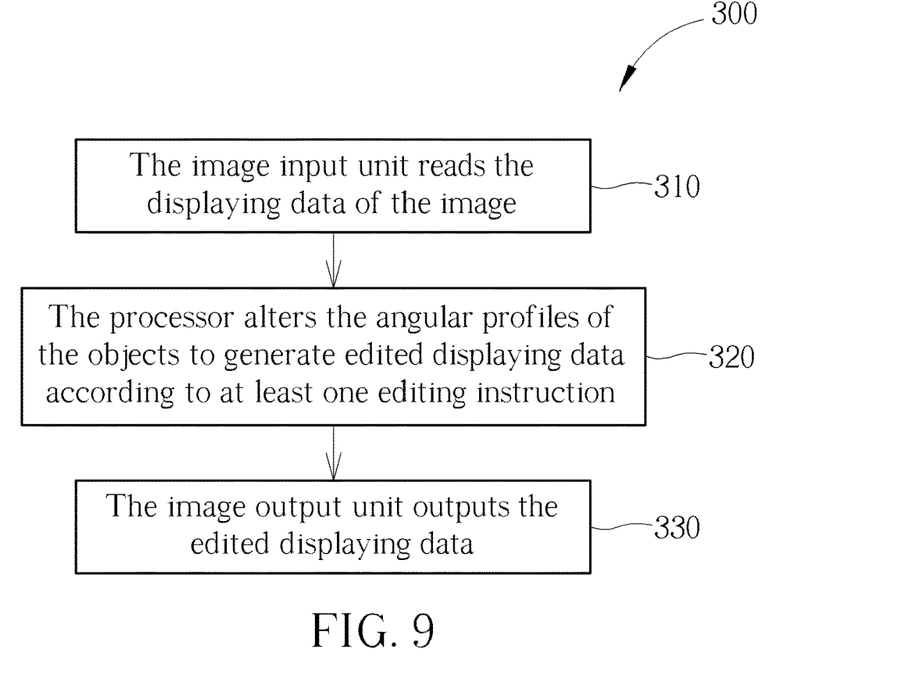
FIG. 9 shows a flowchart of a method for editing the image according to one embodiment.

FIG. 9 shows a flowchart of a method 300 for editing the image IMG1 according to one embodiment. In some embodiments, the method 300 may be performed with the image editing system 100 or 200. The method 300 includes steps S310 to S330.

S310: The image input unit 110 reads the displaying data of the image IMG1;

S320: The processor 120 alters the angular profiles of the objects to generate edited displaying data ED1 according to at least one editing instruction; and S330: The image output unit 130 outputs the edited displaying data ED1.

In some embodiments, the image input unit 110 may read the displaying data D1 in step S310. The displaying data D1 may include color maps $RM_1$ to $RM_x$, $GM_1$ to $GM_x$, and $BM_1$ to $BM_x$ to store the angular profiles of the objects in the image IMG1. However, in some other embodiments, the image input unit 110 may read the aforementioned displaying data D2 or D3 according to the system requirement. The displaying data D2 may include a plurality of parameter maps $PM_1$ to $PM_y$, and each of the parameter maps $PM_1$ to $PM_y$ may be corresponding to a specific fitting parameter of the angular profiles. The displaying data D3 may include DCT coefficient maps $CM_1$ to $CM_z$, and each of the DCT coefficient maps $CM_1$ to $CM_z$ may be corresponding to the coefficients of a specific frequency of the angular profiles.

In step S320, the processor 120 may alter the angular profiles to generate the edited displaying data ED1 according to different editing instructions, such as a generation instruction, a transform instruction, a select instruction, a copy and paste instruction, and a synthesize instruction.

According to the generation instruction, the processor 120 may generate anew angular profile for the object. According to different types of transform instructions, the processor 120 may sharpen the angular profiles, broaden the angular profiles, shift the angular profiles in angles, shift the angular profiles in intensities, reverse the angular profiles in angles, reverse the angular profiles in intensities, scale the angular profiles, duplicate the angular profiles, remove noises from the angular profiles, or add noises to the angular profiles, but not limited thereto.

Also, according to the select instruction, the processor may analyze the angular profile of a selected position of the object to determine the material type of the object and combine the positions adjacent to the selected position having angular profiles that are determined to be the material type of the object to define the boundary of the object.

After an object has been selected, the processor 120 would be able to perform some following instructions. For example, the processor 120 may perform the copy and paste instruction. In this case, the processor 120 may copy the angular profiles of the selected object and paste the angular profiles of the select object to another selected object.

In some embodiments, the processor 120 may synthesize at least one angular profile to a selected position in the image according to a synthesize instruction as shown in FIG. 7, creating a translucent visual effect.

In summary, the image editing system and the method for editing an image provided by the embodiments of the present disclosure may allow the user to edit the angular profiles of the objects in the image, thereby improving the image quality. Furthermore, by providing different types of transform instructions, the image editing system may help to create unique visual effects and enhance the kirameki effects for display.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for editing an image comprising:
    an image capturing device capturing the image and generating displaying data according to the image;
    an image input unit reading the displaying data of the image, the displaying data comprising:
        a plurality of angular profiles of an object in the image;
        a plurality of color maps; and
        a plurality of discrete cosine transform coefficient maps corresponding to the plurality of angular profiles;
        wherein the angular profiles comprise color information of the object corresponding to a plurality of viewing angles, and each of the plurality of color maps is corresponding to a specific angle and a specific color;
    a processor altering the plurality of angular profiles of the object to generate edited displaying data according to at least one editing instruction; and
    an image output unit outputting the edited displaying data.

2. The method of claim 1, wherein the displaying data comprises a plurality of parameter maps, and each of the plurality of parameter maps is corresponding to a specific fitting parameter of the plurality of angular profiles.

3. The method of claim 2 further comprising the image input unit receiving a header file listing a plurality of fitting parameters used for describing the plurality of angular profiles.

4. The method of claim 1, wherein the processor altering the plurality of angular profiles to generate the edited displaying data according to the at least one editing instruction comprises:
according to a generation instruction, the processor generating a new angular profile for the object.

5. The method of claim 1, wherein the processor altering the plurality of angular profile of the object to generate the edited displaying data according to the at least one editing instruction comprises:
according to a transform instruction, the processor sharpening the plurality of angular profiles, broadening the plurality of angular profiles, shifting the plurality of angular profiles in angles, shifting the plurality of angular profiles in intensities, reversing the plurality of angular profiles in angles, reversing the angular profiles in intensities, scaling the plurality of angular profiles, duplicating the plurality of angular profiles, removing noises from the plurality of angular profiles, or adding noises to the plurality of angular profiles.

6. The method of claim 1, wherein the processor altering the plurality of angular profile of the object to generate the edited displaying data according to the at least one editing instruction comprises:
according to a select instruction, the processor:
analyzing an angular profile of a selected position of the object to determine a material type of the object; and
combining positions adjacent to the selected position having angular profiles that are determined to be the material type of the object to define a boundary of the object.

7. The method of claim 1, wherein the processor altering the plurality of angular profile of the object to generate the edited displaying data according to the at least one editing instruction comprises:
according to a copy and paste instruction, the processor:
copying the plurality of angular profiles of a selected object; and
pasting the plurality of angular profiles of the selected object to another selected object.

8. The method of claim 1, wherein the processor altering the plurality of angular profile of the object to generate the edited displaying data according to the at least one editing instruction comprises:
according to a synthesize instruction, the processor synthesizing at least one angular profile to a selected area in the image.

9. A method for editing an image comprising:
an image input unit reading displaying data of the image, the displaying data comprising:
a plurality of angular profiles of an object in the image;
a plurality of color maps; and
a plurality of discrete cosine transform coefficient maps corresponding to the plurality of angular profiles;
wherein the angular profiles comprise color information of the object corresponding to a plurality of viewing angles, and each of the plurality of color maps is corresponding to a specific angle and a specific color;
a processor altering the plurality of angular profiles of the object to generate edited displaying data according to at least one editing instruction;
an image output unit outputting the edited displaying data;
a display panel presenting the edited displaying data by simultaneously displaying a plurality of images corresponding to the plurality of viewing angles; and
an optical modulator directing the plurality of images displayed by the display panel to different directions.

10. The method of claim 9, wherein the displaying data comprises a plurality of parameter maps, and each of the plurality of parameter maps is corresponding to a specific fitting parameter of the plurality of angular profiles.

11. The method of claim 10 further comprising the image input unit receiving a header file listing a plurality of fitting parameters used for describing the plurality of angular profiles.

12. The method of claim 9, wherein the processor altering the plurality of angular profiles to generate the edited displaying data according to the at least one editing instruction comprises:
according to a generation instruction, the processor generating a new angular profile for the object.

13. The method of claim 9, wherein the processor altering the plurality of angular profile of the object to generate the edited displaying data according to the at least one editing instruction comprises:
according to a transform instruction, the processor sharpening the plurality of angular profiles, broadening the plurality of angular profiles, shifting the plurality of angular profiles in angles, shifting the plurality of angular profiles in intensities, reversing the plurality of angular profiles in angles, reversing the angular profiles in intensities, scaling the plurality of angular profiles, duplicating the plurality of angular profiles, removing noises from the plurality of angular profiles, or adding noises to the plurality of angular profiles.

14. The method of claim 9, wherein the processor altering the plurality of angular profile of the object to generate the edited displaying data according to the at least one editing instruction comprises:
according to a select instruction, the processor:
analyzing an angular profile of a selected position of the object to determine a material type of the object; and
combining positions adjacent to the selected position having angular profiles that are determined to be the material type of the object to define a boundary of the object.

15. The method of claim 9, wherein the processor altering the plurality of angular profile of the object to generate the edited displaying data according to the at least one editing instruction comprises:
according to a copy and paste instruction, the processor:
copying the plurality of angular profiles of a selected object; and
pasting the plurality of angular profiles of the selected object to another selected object.

16. The method of claim 9, wherein the processor altering the plurality of angular profile of the object to generate the edited displaying data according to the at least one editing instruction comprises:
according to a synthesize instruction, the processor synthesizing at least one angular profile to a selected area in the image.

17. An image editing system comprising:
an image input unit configured to read displaying data of an image, the displaying data comprising:
a plurality of angular profiles of an object in the image;
a plurality of color maps; and
a plurality of discrete cosine transform coefficient maps corresponding to the plurality of angular profiles;
wherein the angular profiles comprise color information of the object corresponding to a plurality of viewing angles, and each of the plurality of color maps is corresponding to a specific angle and a specific color;

a processor configured to receive the displaying data from the image input unit, and alter the plurality of angular profiles of the object to generate edited displaying data according to at least one editing instruction;

an image output unit configured to output the edited displaying data; and a display device comprising:
- a display panel configured to present the edited displaying data by simultaneously displaying a plurality of images corresponding to the plurality of viewing angles; and
- an optical modulator configured to direct the plurality of images displayed by the display panel to different directions.

18. The image editing system of claim 17, wherein:

the displaying data comprises a plurality of parameter maps, and each of the plurality of parameter maps is corresponding to a specific fitting parameter of the plurality of angular profiles; and the image input unit is further configured to receive a header file listing a plurality of fitting parameters used for describing the plurality of angular profiles.

19. The image editing system of claim 17, wherein the processor sharpens the plurality of angular profiles, broadens the plurality of angular profiles, shifts the plurality of angular profiles in angles, shifts the plurality of angular profiles in intensities, reverses the plurality of angular profiles in angles, reverses the plurality of angular profiles in intensities, scales the plurality of angular profiles, duplicates the plurality of angular profiles, removes noises from the plurality of angular profiles, or adds noises to the plurality of angular profiles to according to a transform instruction.

20. The image editing system of claim 17, wherein:

the processor analyzes an angular profile of a selected position of the object to determine a material type of the object, and combines positions adjacent to the selected position having angular profiles that are determined to be the material type of the object to define a boundary of the object according to a select instruction; and the processor copies the plurality of angular profiles of a selected object, and pastes the plurality of angular profiles of the selected object to another selected object according to a copy and paste instruction.

* * * * *